(12) United States Patent
Kerger et al.

(10) Patent No.: US 6,398,183 B1
(45) Date of Patent: *Jun. 4, 2002

(54) AUTOMATIC SHUT-OFF DEVICE FOR A VALVE FOR COMPRESSED OR LIQUEFIED GASES

(75) Inventors: Leon Kerger, Helmdange; Jean-Claude Schmitz, Heisdorf, both of (LU)

(73) Assignee: Torrent Trading Ltd. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,146

(22) Filed: Jun. 8, 2000

Related U.S. Application Data

(63) Continuation-in-part of application No. 09/350,722, filed on Jul. 9, 1999.

(51) Int. Cl.[7] ............................ F16K 31/12; F16K 31/08; F16K 47/00; F16K 15/00

(52) U.S. Cl. ............................ 251/65; 251/12; 251/119; 137/537; 138/46

(58) Field of Search ...................... 138/46, 45; 137/537; 251/12, 118, 119, 65

(56) References Cited

U.S. PATENT DOCUMENTS

| | | | |
|---|---|---|---|
| 2,576,168 A | 11/1951 | Allen | 137/139 |
| 2,693,933 A | 11/1954 | Meinke | 251/65 |
| 3,794,868 A | 2/1974 | Haigh | 310/36 |
| 4,670,939 A | 6/1987 | Fisher | 16/297 |
| 5,586,589 A | 12/1996 | Voelker | 141/349 |

*Primary Examiner*—Kevin Shaver
*Assistant Examiner*—D. Austin Bonderer
(74) *Attorney, Agent, or Firm*—Leydig, Voit & Mayer, Ltd

(57) ABSTRACT

The shut-off device is intended for refillable gas cylinders. In order to be sure that only authorized persons can refill the cylinder, the filling device comprises a non-return valve element (16) which prevents filling and which can only be neutralized using a special magnet (18).

14 Claims, 7 Drawing Sheets

AUTOMATIC SHUT-OFF DEVICE FOR A VALVE FOR COMPRESSED OR LIQUEFIED GASES

RELATED APPLICATIONS

This application is a continuation-in-part of U.S. patent application, Ser. No. 09/350,722, filed Jul. 9, 1999.

FIELD OF THE INVENTION

The present invention relates to an automatic shut-off device for a valve for compressed or liquefied gases comprising a valve body designed to be mounted on a gas cylinder and provided with an internal passage that allows the cylinder to be filled with pressurized gas.

BACKGROUND OF THE INVENTION

Although not restricted thereto, the invention is more specifically aimed at a valve of the type described in Kerger, U.S. Pat. No. 5,282,496, the entire disclosure of which is hereby incorporated by reference in its entirety. This patent relates to a valve for refillable cylinders and which comprises a level-regulating valve to prevent it from being possible for the cylinder to be filled beyond a certain limit, for example 80% of its maximum capacity, so as to avoid potential risks of an accident.

However, there are still risks of an accident either if the cylinders are refilled by non-specialists and do not have level-regulating valves as proposed in the aforementioned patent, or if they are refilled with an inappropriate gas or if the user manages to neutralize the level-regulating valve, or even for other reasons.

SUMMARY OF THE INVENTION

The object of the present invention is to provide a simple and effective automatic shut-off device for a valve like the one described in the preamble and which prevents a gas cylinder from being filled by a non-specialist or unauthorized individual who does not possess special equipment.

In order to achieve this object, the invention provides an automatic shut-off device as described in the preamble which is characterized in that the internal passage has a widened cross section containing a ball sensitive to a magnetic field and of a diameter greater than the diameter of the passage and which acts as a non-return valve element by blocking the passage in the direction of filling, and in that said valve element can be neutralized by shifting the ball sideways under the effect of a magnetic field generated by a magnet placed on the outside of the valve.

In consequence, any attempt at filling the cylinder is bound to fail given that the ball, under the effect of its own weight and the pressure of the filling gas, is pressed against its seat which is formed by the upper edge of the passage and closes the passage toward the inside of the cylinder. Only somebody who knows how to open the passage and is in possession of an appropriate magnet will be able to carry out filling once he has moved the ball off its seat using this magnet.

Any attempt at filling the cylinder with the cylinder lying on its side is also bound to fail. Admittedly, by lying the cylinder down the passage can be opened because the ball, under the effect of its own weight, moves off its seat, but the pressure of the filling gas returns the ball onto its seat and automatically closes the passage.

According to one preferred embodiment, there is a tube made of synthetic material inside the axial passage. The upper edge of this tube serves to form the seat for the ball.

It is also possible to envisage a niche in the region of the ball in the exterior wall of the valve body and which is intended to accommodate a magnet of complementary shape. It is therefore necessary not only to have a magnet available to open the device but, in addition, this magnet has to have a special shape adapted to suit that of the niche.

The valve may also comprise means for preventing the ball from obstructing the upper passage above the widened cross section. These means may consist of a polygonal cross section of this passage or of a spring provided between this passage and the ball.

BRIEF DESCRIPTION OF THE DRAWINGS

Other specific features of the invention will emerge from the description of an advantageous embodiment, presented below by way of an illustration, with reference to the appended drawings in which.

DETAILED DESCRIPTION OF THE PREFERRED EMBODIMENT

Figure 1:
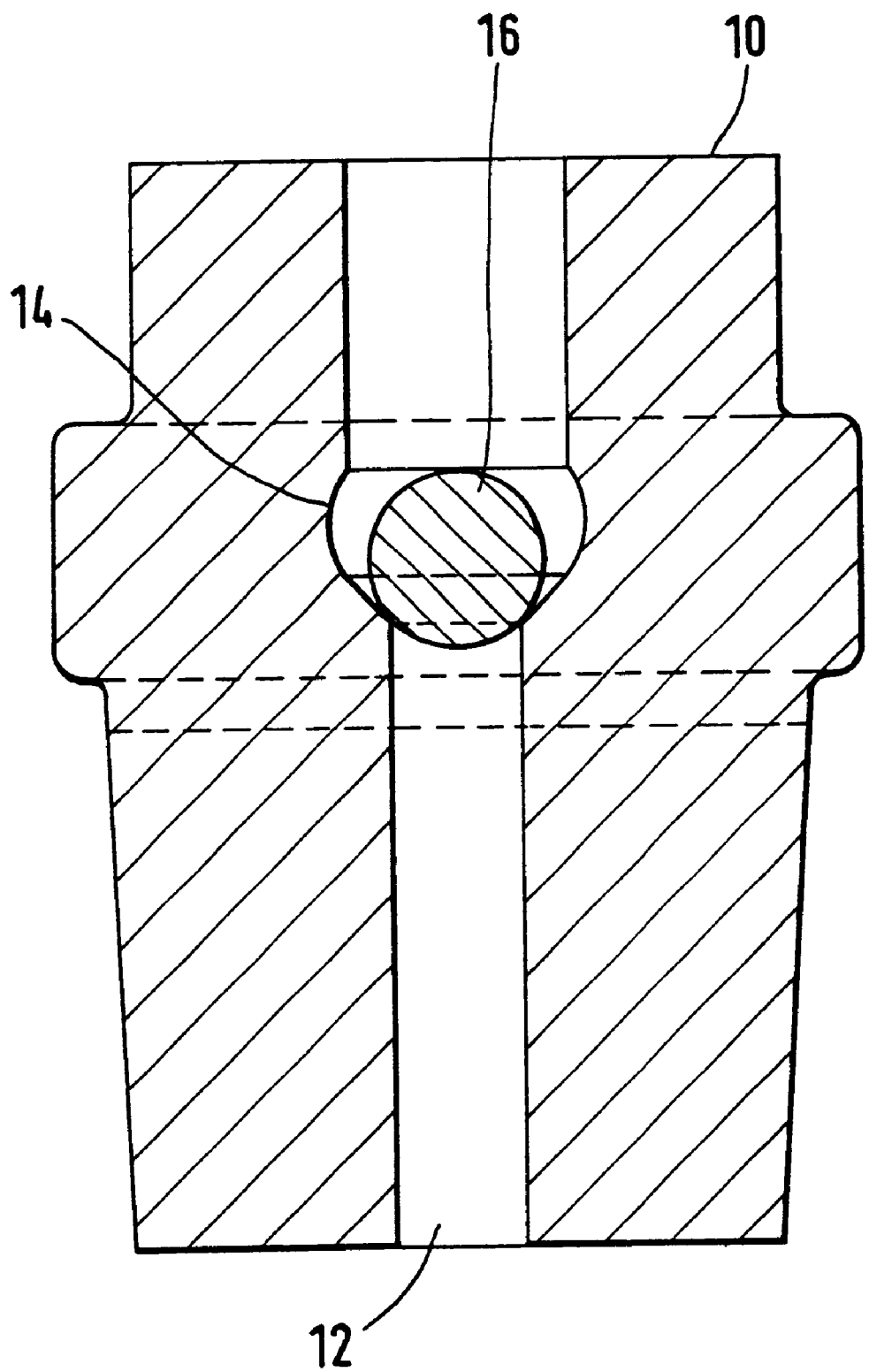
FIG. 1 depicts a partial section view through the body of a valve provided with a first embodiment of an automatic shut-off device according to the present invention in the shut off position.

The reference 10 denotes part of a valve designed to be mounted on a refillable gas cylinder. The reference to a gas cylinder is not restrictive and extends to cover all kinds of reservoir. This may be a valve as described in Kerger, U.S. Pat. No. 5,282,496 or any other device allowing the cylinder to be refilled, with or without a level-regulating valve, operating as a two-way valve or a one-way valve. Reference can be hade to Kerger, U.S. Pat. No. 5,282,496 for an exemplary application of the invention.

The body 10 has an axial passage 12 communicating with the inside of the cylinder, not depicted. At a certain point, this passage ends in a widened portion 14 containing a spherical metallic ball 16, preferably made of special steel. This ball normally rests on its seat which is formed by the upper edge of the passage 12 and therefore prevents filling gas from entering the cylinder.

Figure 2:
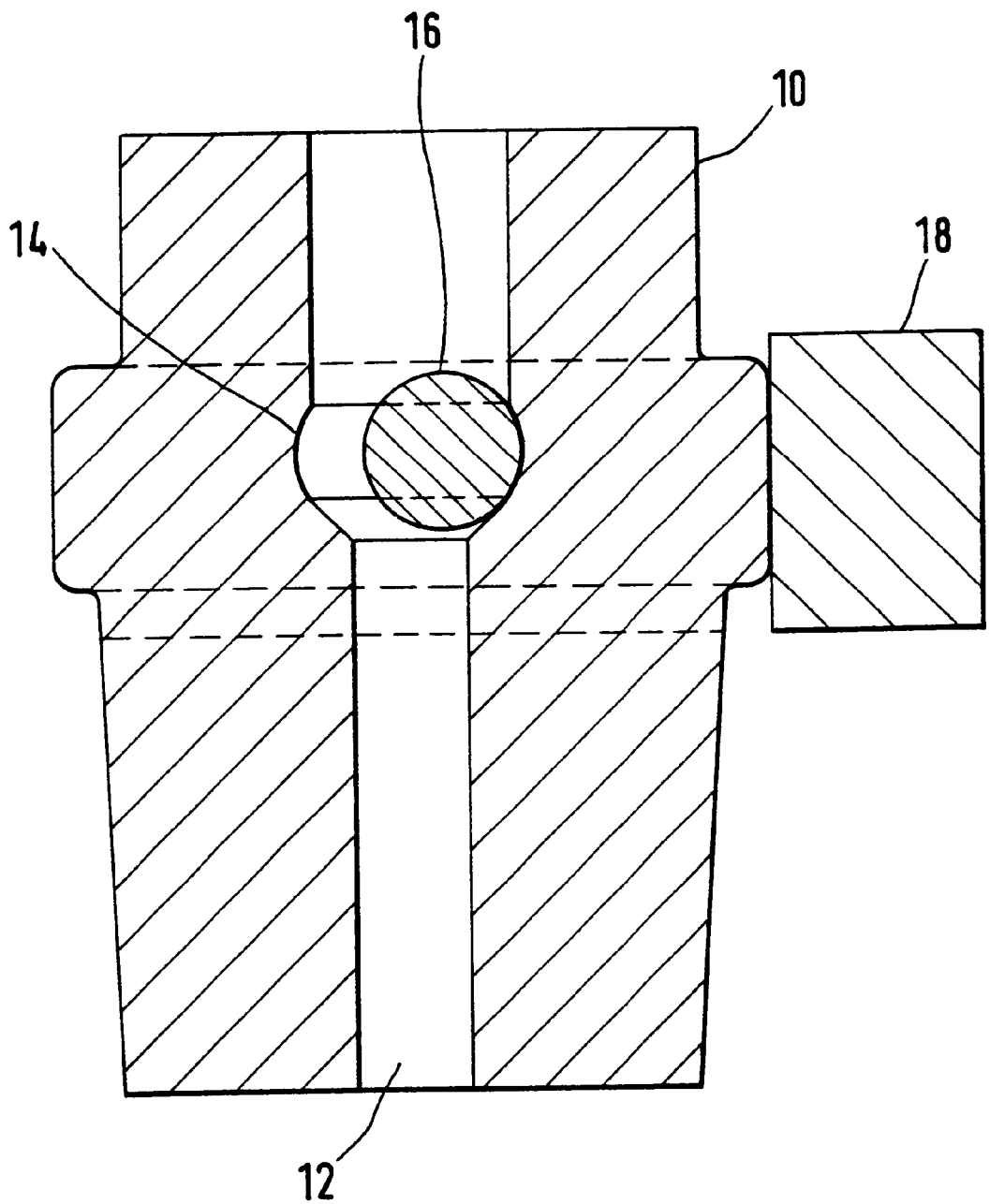
FIG. 2 is a view similar to that of FIG. 1 but during the neutralization phase.

FIG. 2 shows the neutralizing of the device using a powerful magnet 18 which is brought up close to the body 10 of the valve in the region of the ball 16 and whose field is powerful enough to move the ball 16 off its seat and open the passage to the filling gas. The magnet 18 may be a simple permanent magnet.

In order to further complicate the task of anybody wishing to discover how to neutralize the shut-off system and who may avail himself of a magnet in order to be able to fill the cylinder, it is possible to provide a niche in the wall of the body 10 into which niche the magnet has to be introduced.

This niche could extend as far as close to the widened portion 14, and would also then have the further advantage of bringing the magnet even closer to the ball 16.

Figure 3:
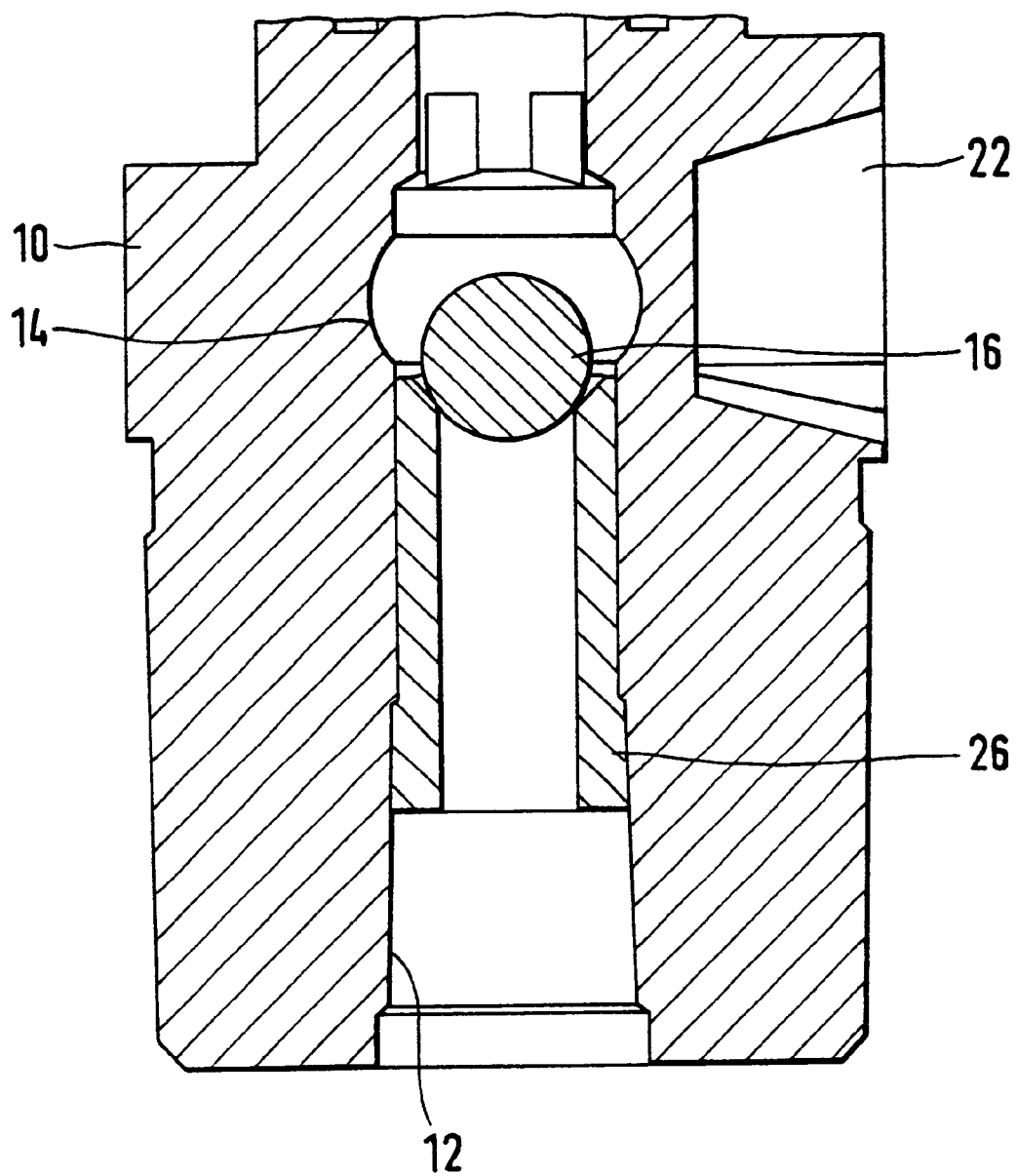
FIG. 3 depicts a partial section view through the body of a valve provided with a second embodiment of an automatic shut-off device according to the present invention, in the shut off position.
Figure 4:
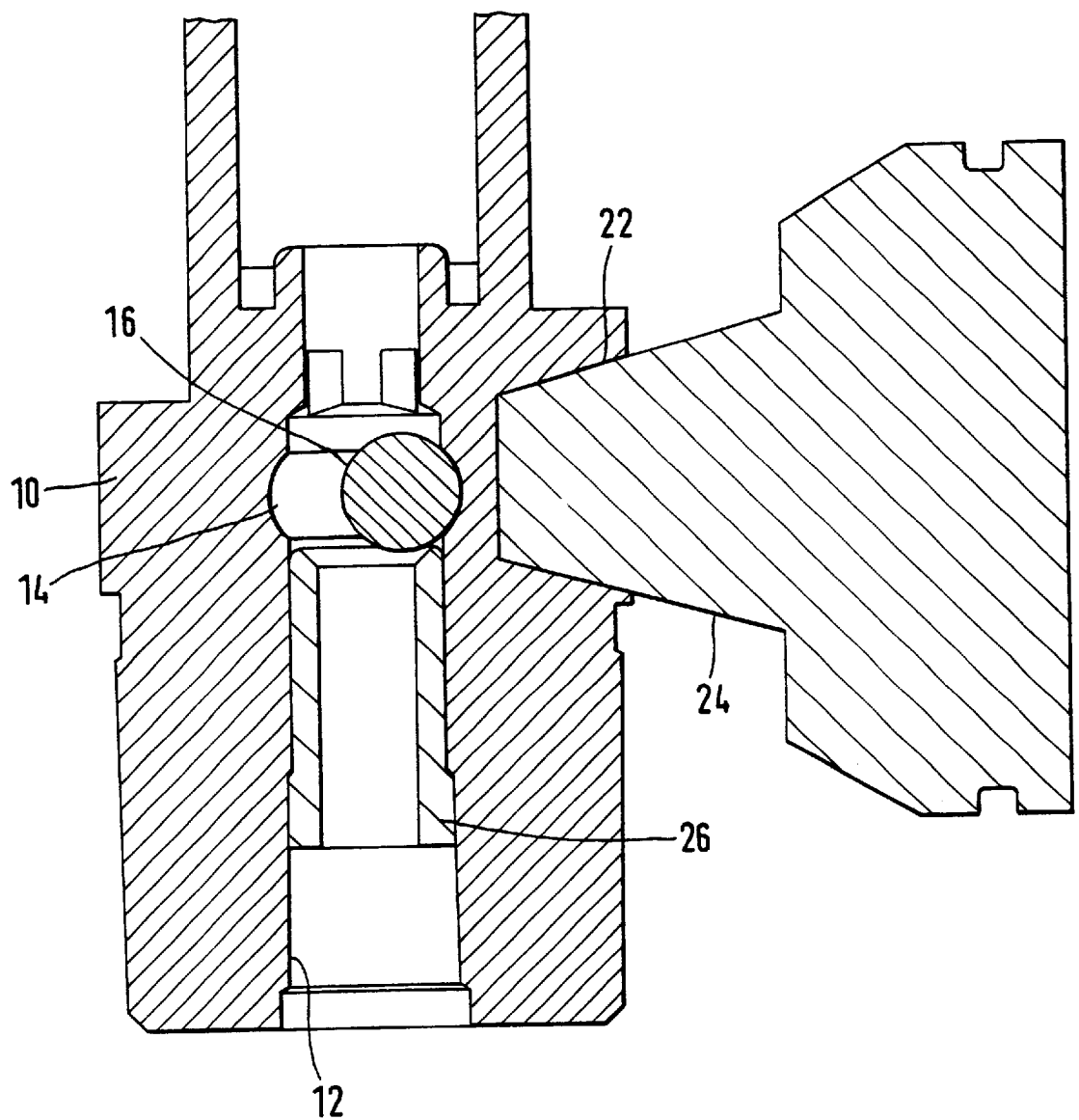
FIG. 4 depicts a view similar to that of FIG. 3, but during the neutralization phase.

FIGS. 3 and 4 show one such embodiment with a cut-out or niche 22 in the wall 10 in the region of the widened portion 14. The niche 22 may be cylindrical or frustoconical as shown in the figures. In vertical section, in the figures, the niche 22 may have a round or polygonal cross section, for example a triangular cross section. In order to be able to move the ball 16 away from its seat and uncover the passage 12, it is therefore necessary to have use of a magnet 24 (FIG. 4) which has a shape that complements that of the niche 22.

In order to further complicate the task of people who are not authorized to fill the gas cylinder, it would be possible, at the bottom of the niche, to provide an axial stem, so that the magnet to be introduced into the niche would have to have a corresponding bore in its head so that it could be introduced into the niche 22.

In the case of a niche 22 and of a magnet 24 which are cylindrical, it would also be possible to provide these with complementary screw threads, possibly a special thread type, so that the magnet would have to be screwed into the body 10 of the valve. It would therefore be impossible for the shut-off to be neutralized with a magnet that could be sourced on the open market.

In the embodiment of FIGS. 3 and 4, the widened cross section 14 does not need to extend over 360° and may be restricted to a lateral notch in the region of the niche 22. However, for reasons of ease of manufacture, it may be preferable for the widening 14 to also be provided, in the case of FIGS. 3 and 4, across the entire circumference.

FIGS. 3 and 4 also show, by way of a variation, a tube 26 provided in the passage 12 and the upper edge of which it intended to form the seat for the ball 16. This tube may be made of synthetic substance, for example nylon, and its purpose is to ensure better shut-off at the ball 16 by comparison with metal-to-metal contact.

Figure 5:
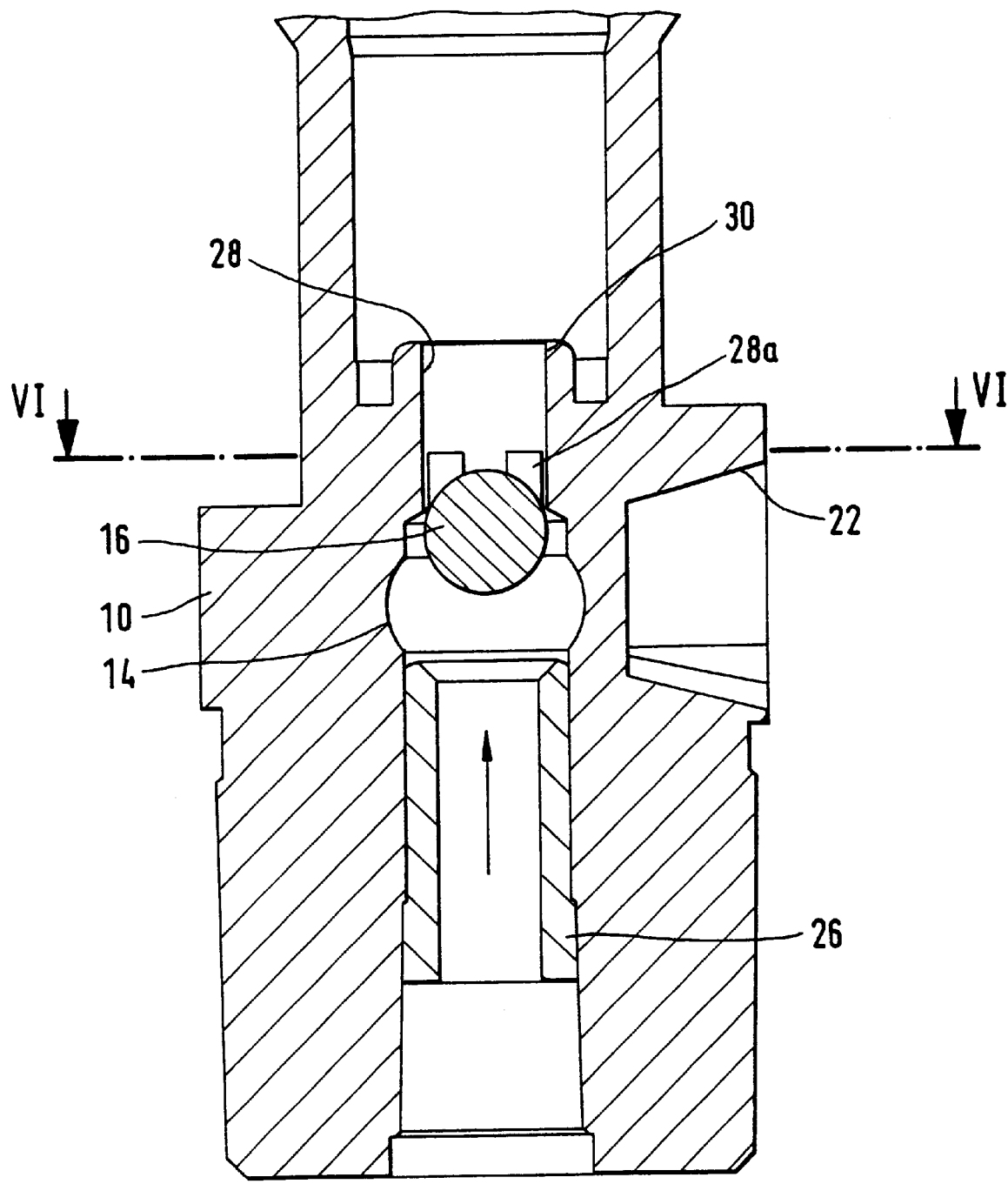
FIG. 5 shows a view similar to that of FIG. 3, while gas is being withdrawn from the gas cylinder.

If, as is generally the case, the passage 12 is used for the passage of gas when filling the cylinder with gas and withdrawing gas there from, a problem may arise when withdrawing gas. Specifically, as FIG. 5 shows, when withdrawing gas, the gas pressure is enough to lift the ball 16 and hold it against the lower edge of the upper passage 28 which leads to the seat 30 of the non-depicted shut-off member of the valve, which would close the passage 28 and prevent the gas from being withdrawn. To solve this problem it is possible, in the lower part of the passage 28, to provide an obstacle, for example in the form of a diametral stem which prevents the ball 16 from obstructing the passage 28.

Figure 6:
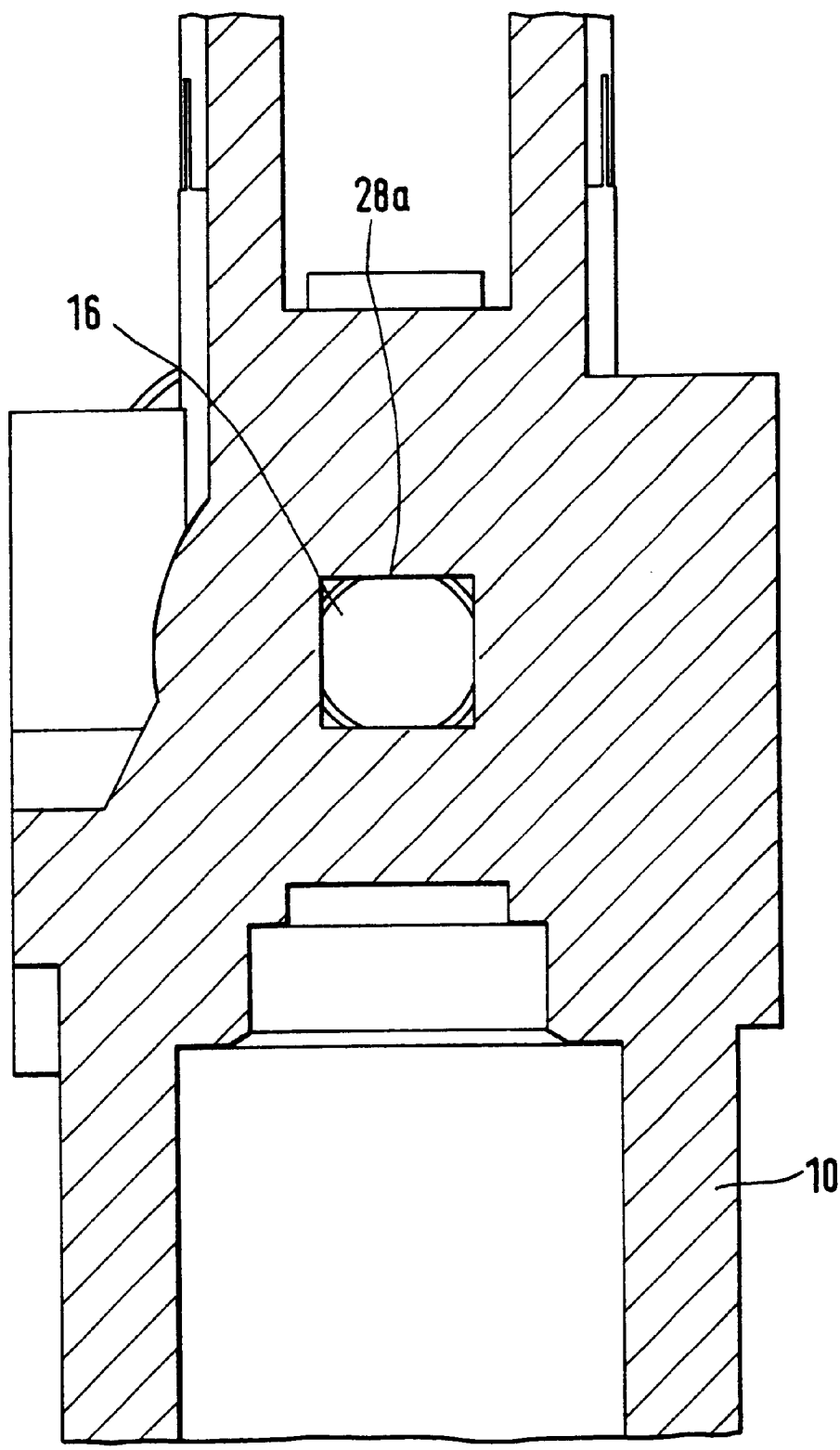
FIG. 6 is a cross section on the section plane VI—VI of FIG. 5.

It is also possible to convert the circular cross section of the passage 28, at least in the lower region 28a, into a polygonal cross section, for example a square cross section as shown in FIGS. 3 to 5 and more particularly in the view in cross section that is FIG. 6. Thus, when the ball 16 is forced against the lower end of the passage 28 there remain several, in this particular instance, four, passages 28 for the gas in the four corners.

Figure 7:
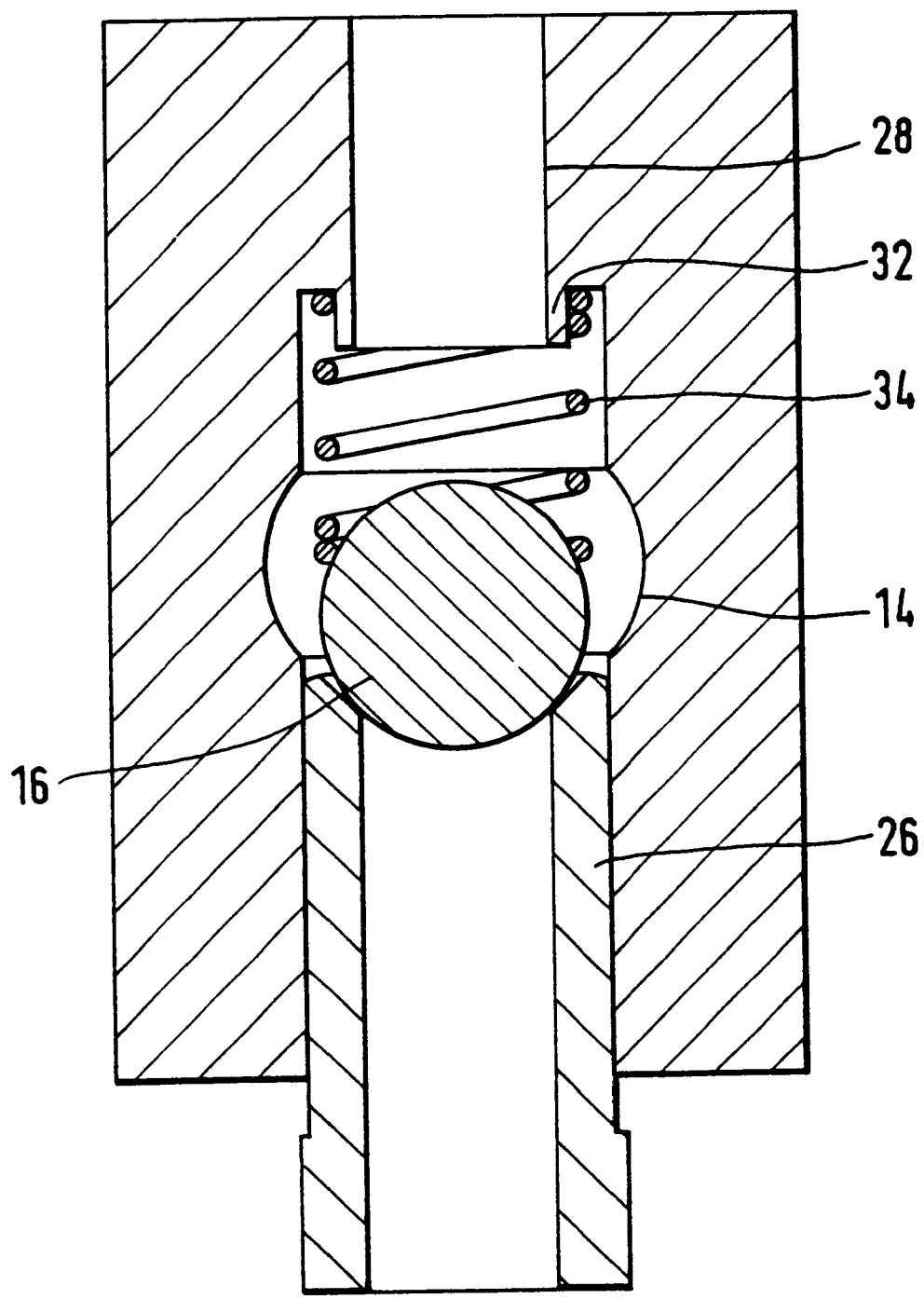
FIG. 7 is a partial section view of a third embodiment.

FIG. 7 shows another means intended to prevent the passage 28 from being obstructed by the ball 16 when gas is being withdrawn. In this embodiment, there is a spring 34 provided between the ball 16 and the passage 28 which is, for reference, extended downwards by a circular axial flange 32 to ensure that the spring is held. The force of this spring 34 is great enough to keep the ball 16 in a floating state away from the flange 32 during a normal operation of withdrawing gas.

In one advantageous embodiment, it is possible to benefit from the presence of this spring 34 to design it as a flow limiter or safety valve. Such limiters are known per se and are used to shut off the flow of gas when the flow rate or the pressure exceeds a predetermined limit. This may, in particular, arise in the event of an accident, for example if the valve should break. All that is then required is simply for the force of the spring 34 to be rated such that it prevents the passage 28 from being shut off by the ball 16 under normal gas pressure and flow rate conditions but allows shut-off in the event of abnormal operation.

What is claimed is:

1. Automatic shut-off device for a valve for compressed or liquefied gases comprising a valve body (10) designed to be mounted on a gas cylinder and provided with an internal passage (12) that allows the cylinder to be filled with pressurized gas, characterized in that the internal passage (12) has a widened cross section (14) containing a ball (16) sensitive to a magnetic field and of a diameter greater than the diameter of the passage and which acts as a non-return valve element by blocking the passage in the direction of filling, and in that said valve element can be neutralized by shifting the ball (16) sideways under the effect of a magnetic field generated by a magnet (18) placed on the outside of the valve.

2. Device according to claim 1, characterized by a tube (26) made of synthetic material provided in the passage (12) and the upper edge of which forms the seat for the ball (16).

3. Device according to claim 1 or 2, characterized by a niche (22) provided, in the region of the widened cross section (14), in the exterior wall of the valve and intended to accommodate a magnet (24) of complementary shape.

4. Device according to claim 3, characterized in that the niche (22) and the magnet (24) have a cylindrical shape.

5. Device according to claim 3, characterized in that the niche (22) and the magnet (24) have a frustoconical shape.

6. Device according to claim 4, characterized in that the niche (22) and the magnet (24) have a polygonal cross section in a plane parallel to the axis of the valve.

7. Device according to claim 6, characterized by means for preventing the ball (16) from obstructing the upper passage (28) above the said widened cross section (14).

8. Device according to claim 5, characterized in that the niche (22) and the magnet (24) have a polygonal cross section in a plane parallel to the axis of the valve.

9. Device according to claim 8, characterized by means for preventing the ball (16) from obstructing the upper passage (28) above the widened cross section (14).

10. Device according to claim 1, characterized by means for preventing the ball (16) from obstructing the upper passage (28) above the said widened cross section (14).

11. Device according to claim 10, characterized in that the said spring (34) is designed as a flow limiter.

12. Device according to claim 10, characterized in that the said means consist of a polygonal cross section at least of the lower part (28a) of the passage (28).

13. Device according to claim 10, characterized in that the said means consist of a spring (34) provided between the ball (16) and the passage (28).

14. Device according to claim 13, characterized in that the passage (28) is extended, downwards, by a circular axial flange (32) extending into the spring (34).

* * * * *